(12) United States Patent
Singh

(10) Patent No.: US 11,452,583 B2
(45) Date of Patent: Sep. 27, 2022

(54) DENTAL IMPLANT EVALUATION UNIT

(71) Applicant: Paramvir Singh, Naperville, IL (US)

(72) Inventor: Paramvir Singh, Naperville, IL (US)

( * ) Notice: Subject to any disclaimer, the term of this patent is extended or adjusted under 35 U.S.C. 154(b) by 226 days.

(21) Appl. No.: 16/722,184

(22) Filed: Dec. 20, 2019

(65) Prior Publication Data

US 2020/0222154 A1 Jul. 16, 2020

Related U.S. Application Data

(60) Provisional application No. 62/790,529, filed on Jan. 10, 2019.

(51) Int. Cl.
 *A61C 8/00* (2006.01)

(52) U.S. Cl.
 CPC .......... *A61C 8/0022* (2013.01); *A61C 8/0012* (2013.01); *A61C 8/0093* (2013.01); *A61C 2008/0084* (2013.01)

(58) Field of Classification Search
 CPC ... A61C 8/0022; A61C 8/0012; A61C 8/0093; A61C 2008/0084
 USPC .................................................. 433/172–176
 See application file for complete search history.

(56) References Cited

U.S. PATENT DOCUMENTS

| | | | | |
|---|---|---|---|---|
| 4,474,556 A | * | 10/1984 | Ellis | A61C 8/0075 |
| | | | | 433/173 |
| 5,227,602 A | | 7/1993 | Kuhn | |
| 5,456,601 A | * | 10/1995 | Sendax | A61C 8/0009 |
| | | | | 433/173 |
| 5,749,732 A | * | 5/1998 | Sendax | A61C 8/0022 |
| | | | | 433/225 |
| 6,273,720 B1 | * | 8/2001 | Spalten | A61C 8/005 |
| | | | | 433/172 |
| 6,379,154 B2 | * | 4/2002 | DeVincenzo | A61C 8/0022 |
| | | | | 433/176 |
| 6,793,491 B2 | | 9/2004 | Klein et al. | |
| 6,979,496 B2 | | 12/2005 | Haymann | |

(Continued)

FOREIGN PATENT DOCUMENTS

| | | | | |
|---|---|---|---|---|
| DE | | 19948910 A1 | * 12/2000 | ............. A61C 8/001 |
| WO | WO1988006429 | | 9/1988 | |

(Continued)

OTHER PUBLICATIONS

Papazian, Four Uses of a Disposable Implant Mount, Journal of Prosthetic Dentistry, 1998.

*Primary Examiner* — Matthew M Nelson
(74) *Attorney, Agent, or Firm* — The Law Offices of Konrad Sherinian, LLC

(57) ABSTRACT

A dental implant evaluation unit is disclosed and described. The dental implant evaluation includes a body portion having threads that mimic the general thread pattern of an actual dental implant, without attempting to copy any of the osseointegrative features of the actual implant. A threaded collar is associated with the body portion, and, in certain embodiments, a safety flange is screwed to the threaded collar. The safety flange prevents the dental implant evaluation unit from infiltrating the sinus of a patient when testing the fit of a maxillary implant. The dental implant evaluation unit can be used by a dentist to evaluate the proper size and fit for an actual dental implant by installing the dental implant evaluation unit, and imaging the same, prior to installing the actual dental implant.

5 Claims, 4 Drawing Sheets

(56) References Cited

U.S. PATENT DOCUMENTS

| | | | |
|---|---|---|---|
| 7,314,375 B2 | 1/2008 | Gault | |
| 7,429,175 B2* | 9/2008 | Gittelson | A61C 1/084 433/173 |
| 7,871,268 B2 | 1/2011 | Touchstone | |
| 8,876,530 B2* | 11/2014 | Nouriam | A61C 1/084 433/215 |
| 11,033,309 B2* | 6/2021 | Zadeh | A61B 17/8685 |
| 2001/0005577 A1* | 6/2001 | Devincenzo | A61C 8/0022 433/176 |
| 2001/0012607 A1* | 8/2001 | Robinson | A61C 8/0006 623/17.17 |
| 2005/0026113 A1* | 2/2005 | Chen | A61B 5/076 433/173 |
| 2006/0154205 A1* | 7/2006 | Reggie | A61C 8/0031 433/176 |
| 2008/0293013 A1* | 11/2008 | Lussi | A61C 1/084 433/173 |
| 2008/0293017 A1* | 11/2008 | Lussi | A61C 8/009 433/196 |
| 2009/0017418 A1* | 1/2009 | Gittelson | A61C 1/084 433/174 |
| 2010/0323326 A1* | 12/2010 | Reed | A61C 8/0018 433/174 |
| 2011/0318706 A1* | 12/2011 | Brajnovic | A61C 8/0022 433/174 |
| 2012/0045735 A1* | 2/2012 | Drapeau | A61L 27/54 433/172 |
| 2012/0100502 A1* | 4/2012 | Djordjevic | A61C 8/0018 433/173 |
| 2012/0129126 A1* | 5/2012 | Nouriam | A61C 8/0089 433/141 |
| 2012/0141956 A1* | 6/2012 | Mandell | A61C 5/30 433/199.1 |
| 2014/0106305 A1* | 4/2014 | Jacoby | A61C 8/0069 433/173 |
| 2015/0125818 A1* | 5/2015 | Binderman | A61C 8/0074 433/173 |
| 2017/0049538 A1* | 2/2017 | Yun | A61C 8/0009 |
| 2017/0112554 A1* | 4/2017 | Zadeh | A61B 17/0401 |
| 2018/0042704 A1* | 2/2018 | Shahmohammadi | A61C 8/0021 |
| 2018/0280116 A1 | 10/2018 | Hansen et al. | |
| 2020/0030012 A1* | 1/2020 | Zadeh | A61B 17/863 |
| 2020/0222154 A1* | 7/2020 | Singh | A61C 8/0093 |

FOREIGN PATENT DOCUMENTS

| | | |
|---|---|---|
| WO | WO2014001556 | 1/2014 |
| WO | WO2018015562 | 1/2018 |

* cited by examiner

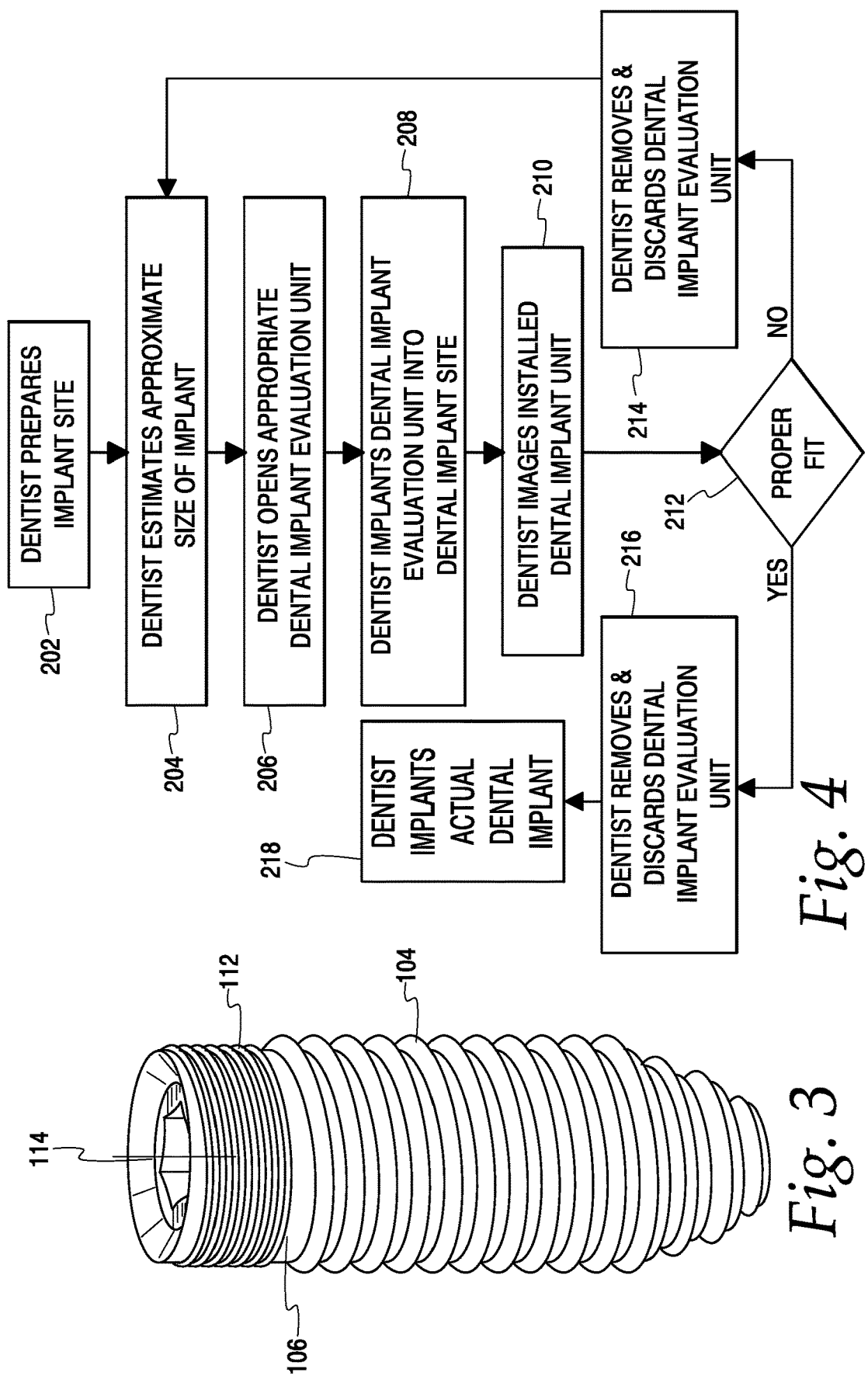

DENTAL IMPLANT EVALUATION UNIT

CROSS REFERENCE TO RELATED APPLICATIONS

This application claims priority to Provisional Application No. 62/790,529 filed Jan. 10, 2019 in the name of Paramvir Singh, which is hereby incorporated by reference in its entirety.

FIELD OF THE DISCLOSURE

The present invention generally relates to dental implants, and more particularly relates to an evaluation unit for use by a dentist to evaluate the correct size of dental implant to use for a particular implant site as well as verify the placement, including the angle and positioning of the dental implant site.

DESCRIPTION OF BACKGROUND

Dental implants have become ubiquitous, with more than five million implants being placed by dentists in the United States every year. Dental implants help improve both the health and attractiveness of dental patients. When performed by a competent professional, the dental implant process is generally safe and effective, with the five-year survival rate of implants being between 93 percent and 98 percent.

However, there are a number of risks and issues with the present dental implant process. First, dental implants are quite expensive, with the typical implant costing five hundred dollars ($500) or more, with certain implants costing in excess of two-thousand dollars ($2,000). In addition, dental implants come in a variety of sizes, with diameters of 3.0 millimeters to 6.0 millimeter and lengths from 5.0 millimeters to 11.0 millimeters being common. Within these ranges, there are numerous options. Accordingly, after a dentist has drilled an implant site in the bone of a patient, the dentist will typically make an educated estimate as to the appropriate size, with the estimation process being directed by well-known guidelines and standard of care concerns; for example, 3.5 millimeter diameter implants are commonly used for mandibular anterior teeth, with the expectation that at least 1.0 mm of bone will be left around the implant (once installed), and the length being estimated based on the particular implant site. Some dentists will actually test several implants at a dental implant site to ensure proper fit before settling on a particular size. While advisable, this process can raise the total cost of the implant procedure substantially—hundreds if not thousands of dollars. A need exists among dentists for a way to test the size and placement of an implant inexpensively.

Second, when placing a maxillary implant there is a small risk that a dental implant can infiltrate the sinus of the patient. While this risk is slight, the consequences can be severe. At a minimum, when the infiltration is detected, the implant must be retrieved via an expensive and difficult surgery. However, if the placement of the dental implant can be checked via an imaging technique, such as an x-ray, the risk of sinus infiltration can be markedly reduced or eliminated. Accordingly, a need exists for a method to eliminate the risk of sinus infiltration by a dental implant.

Objects of the Disclosed System, Method, and Apparatus

Accordingly, it is an object of this disclosure to provide a dental implant evaluation unit.

Another object of this disclosure is to provide a dental implant evaluation unit that matches the size of dental implants that are in widespread use.

Another object of this disclosure is to provide a dental implant evaluation unit for use by a dentist to evaluate the proper size dental implant to use.

Another object of this disclosure is to provide a dental implant evaluation unit that allows a dentist to test the proper size and placement of a dental implant at a low cost.

Another object of this disclosure is to provide a dental implant evaluation unit for use by a dentist to evaluate the position and angle of a dental implant site.

Another object of this disclosure is to provide a dental implant evaluation unit that is adapted to prevent sinus infiltration.

Other advantages of this disclosure will be clear to a person of ordinary skill in the art. It should be understood, however, that a system, an apparatus or a method could practice the disclosure while not achieving all of the enumerated advantages, and that the protected disclosure is defined by the claims.

SUMMARY OF THE DISCLOSURE

A dental implant evaluation unit is disclosed and claimed. The dental implant evaluation unit comprises a body portion. The body portion has the same shape and dimensions as a corresponding dental implant. In addition, the body portion has a threaded portion, with the thread pattern being designed to mimic the thread pattern on the corresponding dental implant. It should be noted that while the general thread pattern is copied, any special features, such as cut outs adapted to provide for bone growth, are not copied as they are not necessary to the function of the dental implant evaluation unit. The body portion can also incorporate a neck that is adapted to sit slightly above the gum line. A threaded collar is sits above the body portion, wherein the threaded post can accommodate a safety flange. The very top of the dental implant evaluation unit incorporates a driver inset, so that the unit can easily be installed.

In certain embodiments the dental implant evaluation unit can also comprise a safety flange coupled to the threaded collar. The safety flange is adapted to ensure that the dental implant evaluation unit cannot infiltrate the sinus of a patient.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is a front perspective view of a dental implant evaluation unit constructed in accordance with this disclosure.

FIG. 4 is a flow chart of a process by which a dentist can utilize a dental implant evaluation unit constructed in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
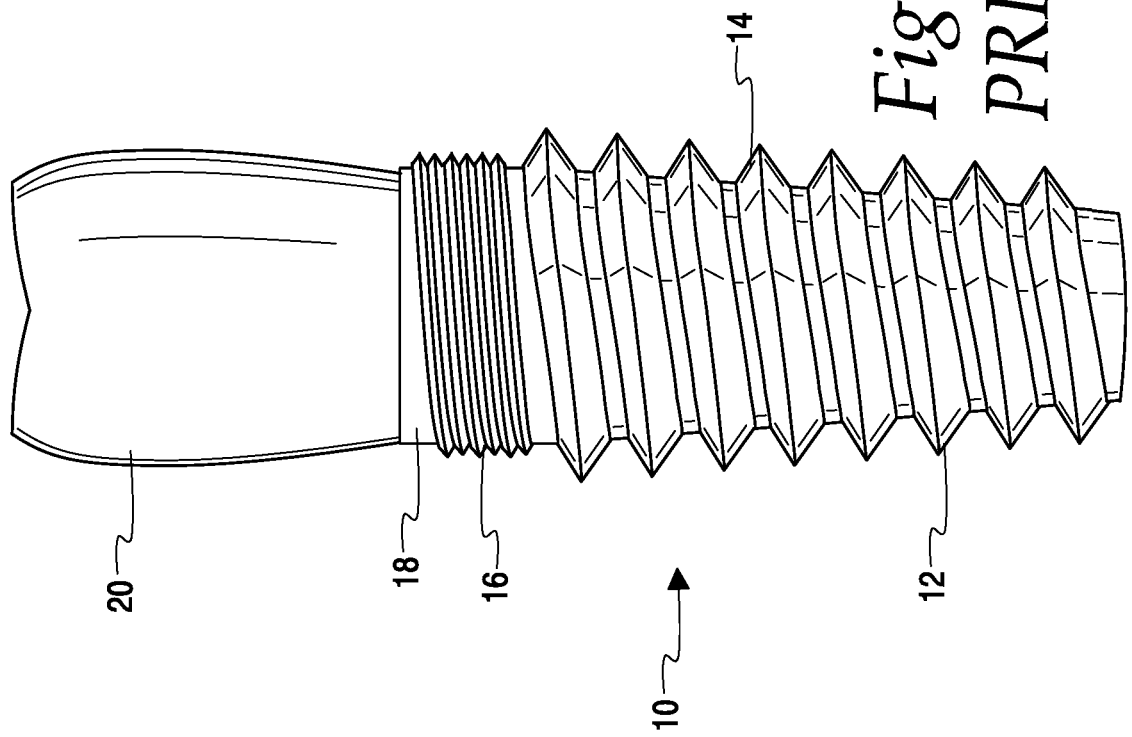
FIG. 1 is a prior art side view of a dental implant.

Turning to the Figures and to FIG. 1 in particular, a prior art dental implant 10 is depicted. In particular, a dental implant 10 comprises an implant 12. The implant 12 includes a threaded portion 14, which is adapted to be screwed into a dental implant site (not shown). Above the threaded portion is a small amount of surface portion 16, which is adapted to sit above the implant site. In addition, a crown 20 is coupled to the implant 12 by one of a variety of means known in the art. In certain cases, an abutment 18 can optionally join the implant 12 to the crown 20.

The prior art dental implant 10 is depicted as incorporating a generic threaded portion 14. However, actual dental implants will incorporate specialized implant portions that typically will have especially engineered threaded portions that are used to promote osseointegration (establishment of a functional connection between the implant and the bone); as explained below, such features are not important for the disclosed dental implant evaluation unit, and are not integrated herein.

Figure 2:
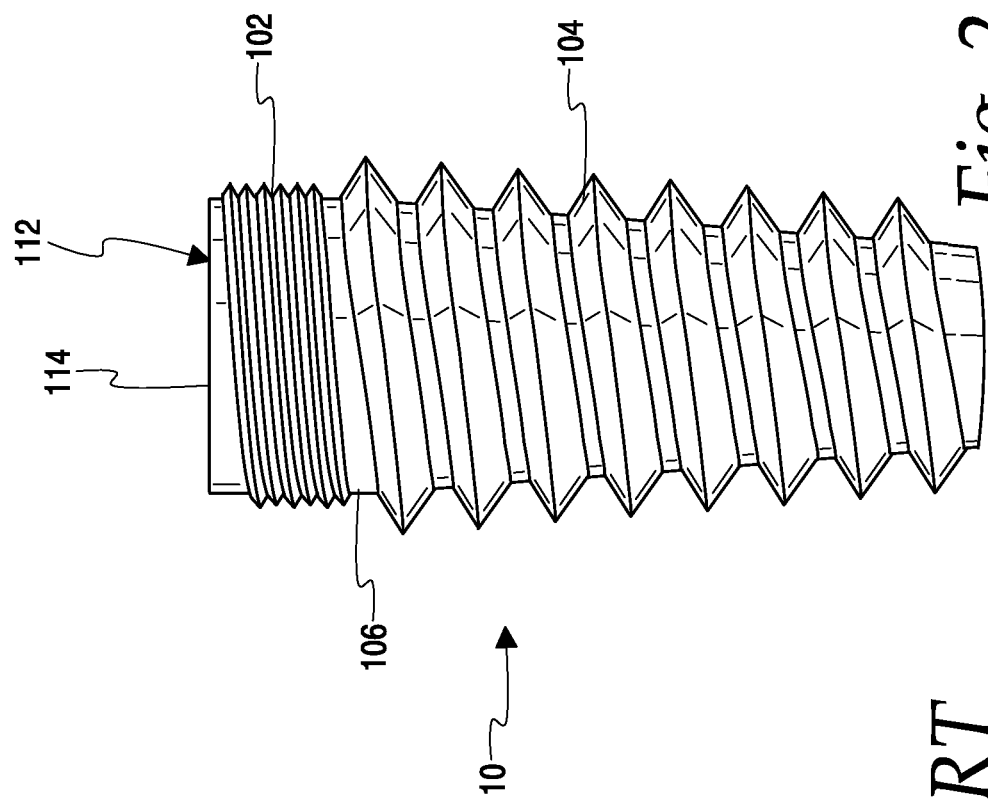
FIG. 2 is a side view of a dental implant evaluation unit constructed in accordance with this disclosure.

Turning to FIGS. 2 and 3, a dental implant evaluation unit 102 is depicted. The dental implant evaluation unit 102 comprises a body portion 104, which is adapted to be driven into a dental implant site (not shown). The body portion 104 corresponds to the implant portion 12 of the prior art dental implant, and typically mimics the thread pattern of the threaded portion 14 of the implant. It should be noted that only the generally thread pattern is mimicked, and the particular osseointegrative features of an implant are not copied, as such are not important to the evaluation of fit and placement, which is the purpose of the dental implant evaluation unit 102. The body portion 104 can be constructed of, for example, a biologically acceptable metal, such as titanium, a titanium alloy, or even aluminum. At the upper end of the body portion 104, a neck portion 106 serves a similar purpose as the surface portion 16 of the prior art dental implant; i.e., to provide a small portion of the implant that is visible over the gum line.

Above the neck portion 106 is a threaded collar 112 that is typically integrally formed with the neck portion 106 or the body portion 104 if the neck portion 106 is not present. The threaded collar 112 is adapted to accommodate a safety flange (discussed below). In the center of the threaded collar 112 is a driver inset 114. It should be noted that the driver inset 114 is depicted as a star pattern; however, a person of ordinary skill in the art would understand that any driver pattern could be used.

Turning to FIG. 4, a process by which a dentist can utilize a dental implant unit that was constructed in accordance with this disclosure. In particular, in step 202, the dentist prepares a dental implant site using methods known in the art. Then, in step 204, the dentist estimates the appropriate size of implant to use. Such estimation can be done using methods known in the art, such as various guides that have been produced by well-known dental implant manufacturers. In step 206, the dentist would then retrieve an appropriate dental implant evaluation unit matching the estimated size of the putative dental implant. It should be noted that, ideally, corresponding dental implant evaluation units would exist for most, if not all, dental implants in all of the sizes that are offered for that implant, so that the size of the same can be properly evaluated using the dental implant evaluation unit. It should also be noted that the dental implant evaluation units can be single or multi-use depending on construction and sterilization procedures.

Then in step 208, the dentist will implant the selected dental implant evaluation into the dental implant site. Typically, this will comprise screwing the dental implant evaluation unit into the dental implant site. Then in step 210, the dentist will image the installed dental implant evaluation unit to judge its size, placement, angle, etc. This ensures that the patient receives an optimal size and placement of the actual dental implant, which will sit in an identical fashion in the dental implant site as the dental implant evaluation unit. If a proper fit is not achieved, the dentist will transition to step 214, where the dental implant evaluation unit will be removed and discarded, and then, in step 204, the dentist will again estimate an appropriate size for the implant and continue executing the process as before. However, in step 212, if it is determined that a proper fit has been achieved, execution will transition to step 216, where the dentist will remove and discard the dental implant evaluation unit, and then the dentist will actually install the implant in step 218.

Figure 6:
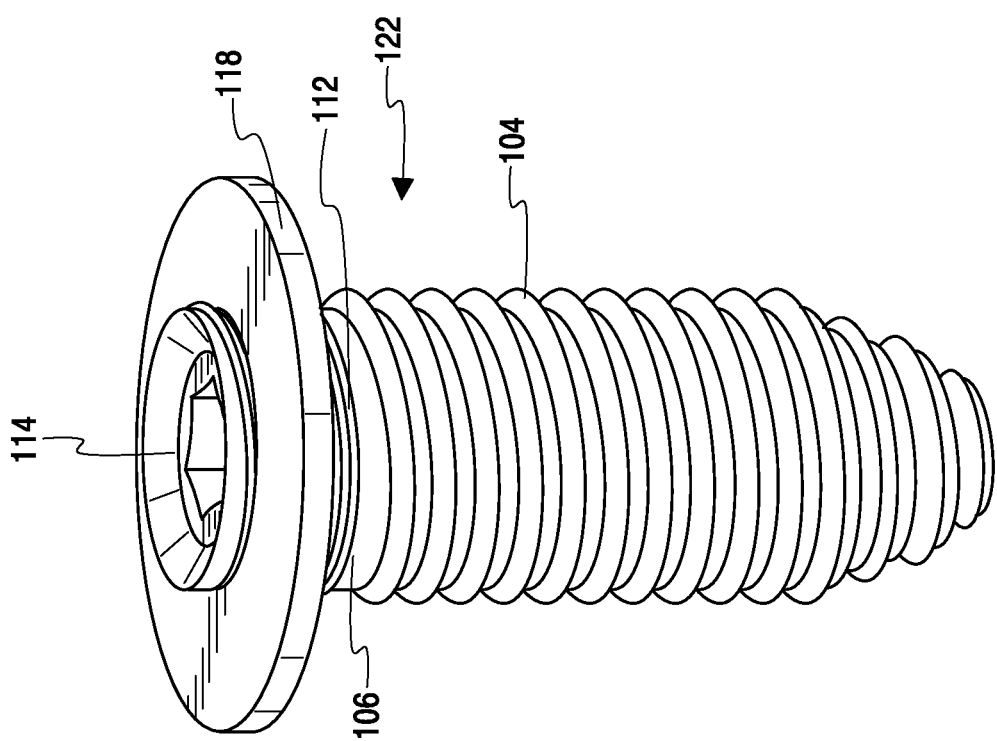
FIG. 6 is a front perspective view of a dental implant evaluation unit incorporating a safety flange and constructed in accordance with this disclosure.
Figure 5:
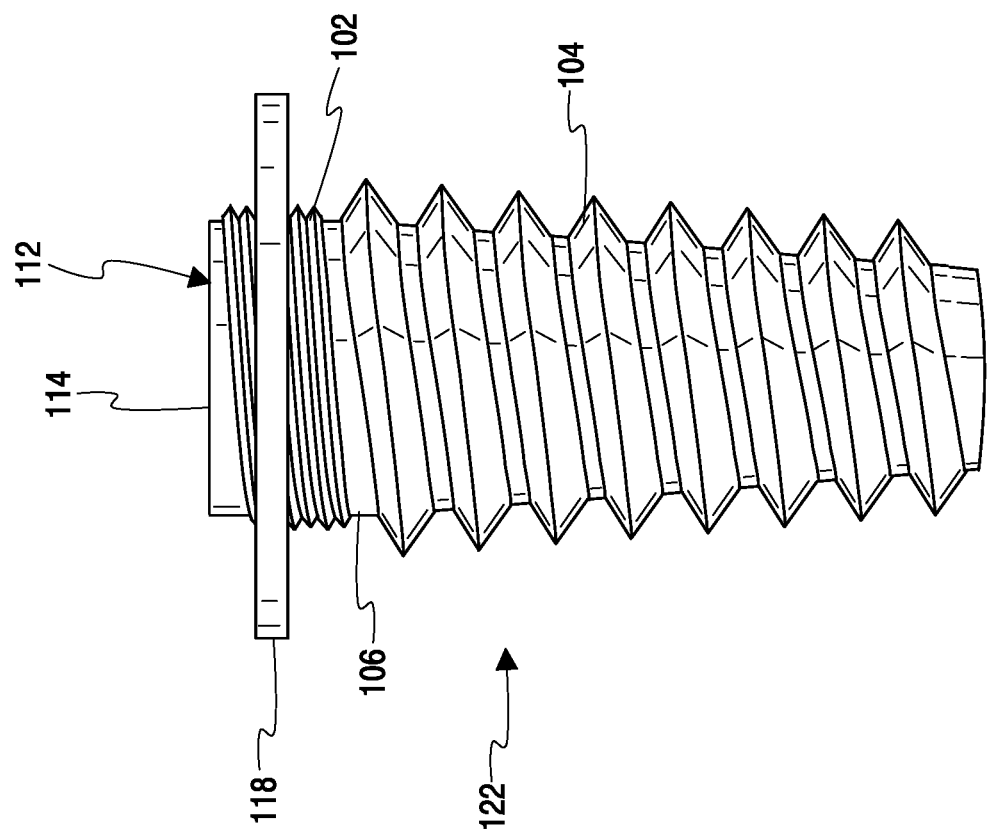
FIG. 5 is a side view of a dental implant evaluation unit incorporating a safety flange and constructed in accordance with this disclosure.

Turning to FIGS. 5 and 6, an alternative dental implant evaluation unit 122 is depicted. The alternative dental implant evaluation unit 122 comprises a body portion 104, which is adapted to be driven into a dental implant site (not shown). The body portion 104 corresponds to the implant portion 12 of the prior art dental implant, and typically mimics the thread pattern of the threaded portion 14 of the implant. It should be noted that only the generally thread pattern is mimicked, and the particular osseointegrative features of an implant are not copied, as such are not important to the evaluation of fit and placement, which is the purpose of the dental implant evaluation unit 102. The body portion 104 can be constructed of, for example, a biologically acceptable metal, such as titanium, a titanium alloy, or even aluminum. At the upper end of the body portion 104, a neck portion 106 serves a similar purpose as the surface portion 16 of the prior art dental implant; i.e., to provide a small portion of the implant that is visible over the gum line.

Above the neck portion 106 is a threaded collar 112 that is typically integrally formed with the neck portion 106 or the body portion 104 if the neck portion 106 is not present. The threaded collar 112 is adapted to accommodate a safety flange (discussed below). At the top of the threaded collar 112 is a driver inset 114. It should be noted that the driver inset 114 is depicted as a star pattern; however, a person of ordinary skill in the art would understand that any driver pattern could be used. Coupled to the threaded collar 112 is a safety flange 118. The safety flange 118 can be, for example, disc shaped as depicted. The purpose of the safety flange 118 is to prevent the alternative dental implant evaluation unit 122 from being driven into the sinus of a patient when operating on a maxillary site. Accordingly, the safety flange 118 is sized so as to be somewhat larger than the space between the two adjoining teeth, making it nearly impossible for the alternative dental implant evaluation unit 122 to be driven into the patient's sinus. Alternatively, the safety flange 118 can be coupled to or integrally formed with the body portion 104 or the neck portion 106 of the dental implant evaluation unit 102. With regards to coupling the safety flange 118 to the dental implant evaluation unit 102, the safety flange 118 will typically be screwed onto the threaded collar 112. In the center of the threaded collar 112 is a driver inset 114. It should be noted that the driver inset 114 is depicted as a star pattern; however, a person of ordinary skill in the art would understand that any driver pattern could be used.

Figure 7:
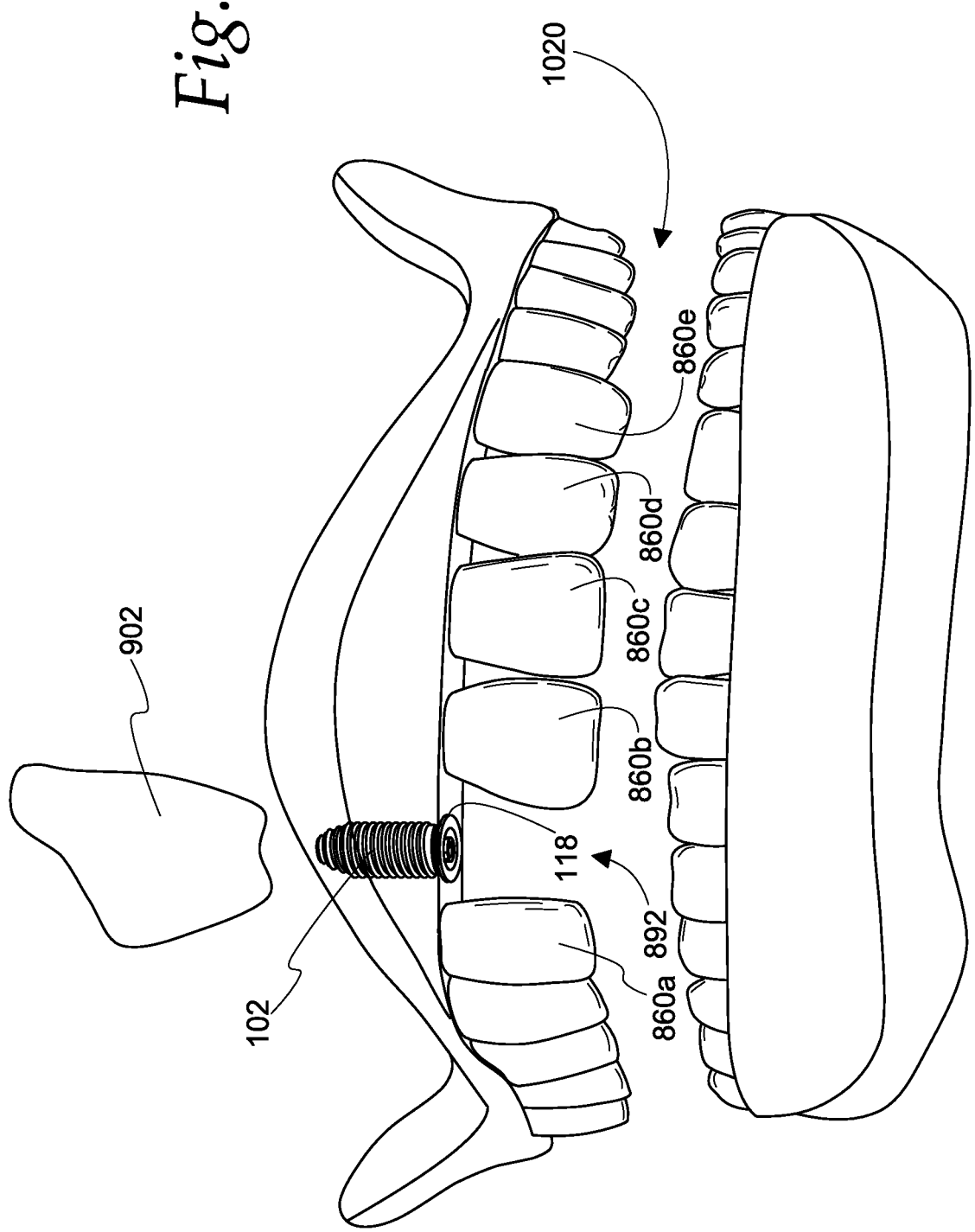
FIG. 7 is a perspective view showing a dental implant evaluation unit placed within a maxillary implant site of a patient.

Turning to FIG. 7, a dental implant evaluation unit 102 is shown placed within a maxillary implant site of a patient. As can be seen, a patient's mouth 1020 has a number of teeth 860-*a*-*e*. An implant site 892 has been prepared in the patient's maxillary jaw. The maxillary sinus 902 is also depicted. As can be seen, if excess force is applied on the dental implant evaluation unit 102, it can be driven into the maxillary sinus 902. However, as can be seen, the flange 118 prevents the dental implant evaluation unit 102 from infiltrating the maxillary sinus 902. This allows a dental practitioner to test various implant sizes without risk so that the perfect implant can be found.

In addition, various modifications can be made. For example, the disclosed dental implant evaluation units can be coupled with a radio frequency analysis device to measure implant stability. Moreover, while a typical implant shape has been disclosed and illustrated, the technology can be adapted to serve as a dental implant evaluation unit for any make or model of implant. In addition, while the dental implant evaluation unit has been described as matching the dimensions of actual implants made by various manufacturers (without matching the osseointegrative features of the implant), the actual dimensions could, in certain embodiments, could be somewhat smaller, such as 5% smaller, than the actual implant, which would allow the actual implant to maintain or improve torque values when the actual implant is installed.

Obviously, many additional modifications and variations of the present disclosure are possible in light of the above teachings. Thus, it is to be understood that, within the scope of the appended claims, the disclosure may be practiced otherwise than is specifically described above The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A dental implant evaluation unit comprising:
   a generally cylindrical body portion having a first thread pattern integrated into the exterior of the body portion;
   a generally cylindrical collar portion integrally formed with the body portion and extending longitudinally upwardly from the body portion, the collar portion having a second thread pattern integrated into the exterior of the collar portion;
   a substantially circular safety flange, the safety flange having an inner periphery, the inner periphery of the safety flange forming a hole extending longitudinally through the safety flange, the inner periphery of the safety flange being screwed onto the second thread pattern of the collar portion;
   the collar portion including an upper surface, the upper surface including a driver inset integrally formed therein, the driver inset being aligned with the hole in the safety flange so as to be unobstructed by the safety flange when the safety flange is coupled to the collar portion.

2. The dental implant evaluation unit of claim 1 wherein the body portion is constructed of a titanium alloy.

3. The dental implant evaluation unit of claim 1 wherein the safety flange has a diameter at least forty percent greater than a diameter of the collar portion.

4. A method of determining the proper size of dental implant for a particular dental implant site, the method comprising the steps of:
   preparing a dental implant site;
   procuring a dental implant evaluation unit of a particular size, the dental implant evaluation unit comprising a generally cylindrical body portion having a first thread pattern integrated into the exterior of the body portion, a generally cylindrical collar portion integrally coupled with the body portion and extending longitudinally from the body portion, and a substantially circular safety flange, the safety flange being coupled to the collar portion, the collar portion having a second thread pattern integrated into the exterior of the collar portion, the safety flange having an inner periphery, the inner periphery of the safety flange forming a hole extending longitudinally through the safety flange, the inner periphery of the safety flange being screwed onto the second thread pattern of the collar portion, the collar portion including an upper surface, the upper surface including a driver inset integrally formed therein, the driver inset being aligned with the hole in the safety flange so as to be unobstructed by the safety flange when the safety flange is coupled to the collar portion;
   after the safety flange is screwed onto the second thread pattern of the collar portion, engaging the driver inset of the collar portion to screw the dental implant evaluation unit into the implant site;
   verifying the fit of the dental implant evaluation unit with regards to the implant site; and
   discarding the dental implant evaluation unit.

5. The method of claim 4 further comprising the step of procuring a dental implant evaluation unit of a second particular size.

\* \* \* \* \*